(12) United States Patent
Gramatikov et al.

(10) Patent No.: US 7,191,872 B2
(45) Date of Patent: Mar. 20, 2007

(54) FORK HEIGHT ADJUSTMENT MECHANISM

(75) Inventors: Ivan K. Gramatikov, Hamilton (CA); William H. Hoff, Tillsonburg (CA)

(73) Assignee: The Raymond Corporation, Greene, NY (US)

( * ) Notice: Subject to any disclaimer, the term of this patent is extended or adjusted under 35 U.S.C. 154(b) by 420 days.

(21) Appl. No.: 10/302,485

(22) Filed: Nov. 22, 2002

(65) Prior Publication Data
US 2004/0099486 A1 May 27, 2004

(51) Int. Cl.
*B66F 9/06* (2006.01)
*B60P 1/02* (2006.01)
*B62B 3/06* (2006.01)

(52) U.S. Cl. .................. 187/222; 187/226; 414/663; 414/785; 414/495

(58) Field of Classification Search ............... 187/222, 187/226, 231, 237, 240, 244; 414/785, 474, 414/476, 663
See application file for complete search history.

(56) References Cited

U.S. PATENT DOCUMENTS

| | | | |
|---|---|---|---|
| 1,865,784 A | 7/1932 | Parker | |
| 2,049,666 A * | 8/1936 | Schafer | 242/308 |
| 2,638,276 A * | 5/1953 | Stamm | 238/349 |
| 2,796,186 A * | 6/1957 | Arnot | 414/608 |
| 3,265,158 A | 8/1966 | Constable | |
| 3,285,663 A * | 11/1966 | Hauschopp | 299/34.11 |
| 3,333,800 A * | 8/1967 | Steiner | 248/662 |
| 3,352,569 A | 11/1967 | Goodacre | |
| 3,421,775 A | 1/1969 | Dugelay | |
| 3,507,351 A | 4/1970 | Goodacre | |
| 4,027,771 A * | 6/1977 | Adams | 414/785 |
| 4,589,669 A | 5/1986 | Kedem | |
| 4,813,703 A | 3/1989 | Fischer | |
| 5,516,128 A | 5/1996 | Nakade et al. | |
| 5,752,584 A * | 5/1998 | Magoto et al. | 187/234 |
| 5,951,234 A | 9/1999 | Johansson | |
| 6,102,371 A * | 8/2000 | Wyers | 254/218 |
| 6,343,907 B1 | 2/2002 | Schalmath | |

FOREIGN PATENT DOCUMENTS

GB 2190896 A * 12/1987

* cited by examiner

*Primary Examiner*—Eileen D. Lillis
*Assistant Examiner*—Greg Adams
(74) *Attorney, Agent, or Firm*—Quarles & Brady LLP

(57) ABSTRACT

A material handling vehicle including a truck body and a fork assembly adjacent the truck body. A link arm extending between the truck body and the fork assembly has a proximal end and a distal end. A first pivot pin is fixed to the body and pivotally links the proximal end of the link arm to the body. A second pivot pin is fixed to the fork assembly and pivotally links the distal end of the link arm to the fork assembly. At least one of the first and second pivot pins includes an eccentric body interposed between ends. The eccentric body defines a first axis, and the ends define a second axis, wherein the link arm pivots about the first axis and rotation of the pivot pin about the second axis moves the first axis relative to the truck body to change the position of the fork assembly relative to the truck body.

18 Claims, 6 Drawing Sheets

FORK HEIGHT ADJUSTMENT MECHANISM

CROSS REFERENCES TO RELATED APPLICATIONS

Not Applicable

STATEMENT REGARDING FEDERALLY SPONSORED RESEARCH

Not Applicable.

BACKGROUND OF THE INVENTION

The present invention relates to material handling vehicles, and more particularly to a mechanism for adjusting the height of forks attached to a material handling vehicle.

Material handling vehicles, such as pallet trucks, typically includes a wheel mounted tractor upon which a fork assembly having a pair of load supporting forks is mounted for vertical movement between a raised and lowered position. Each fork is typically an elongated U-shaped structure including a pair of reinforced opposing walls which define a space in which a fork trail assembly is housed. The fork trail assembly is fixed to each fork proximal a fork distal end, and extends and retracts to support the fork distal end.

Each fork trail assembly typically includes a pivot arm pivotally fixed to the pivot shaft fixed to the fork. A ground engaging wheel is rotatably mounted to the pivot arm. The pivot arm is pivoted to maintain contact of the ground engaging wheel with a support surface as the fork is raised and lowered to support the distal end of the fork. The pivot arm is pivoted by a pull rod, or other link member, having one end pivotally fixed to the pivot arm and an opposing end pivotally linked to a bell crank. The bell crank is linked to the tractor, and pivots as the fork assembly moves between the raised and lowered positions to exert a force on the pull rod and pivot the pivot arm to extend or retract the ground engaging wheel. The slope of the forks (i.e. the height of the fork distal end relative to the height of the fork proximal end) is typically adjustable to compensate for load wheel wear, stacking of manufacturing tolerances, and pallet entry.

One method known in the art for adjusting the slope of the forks is to provide an adjustable length threaded pull rod to partially extend or retract the ground engaging wheel. Changing the length of the rod to partially extend or retract the ground engaging wheel vertically moves the fork distal end without changing the vertical position of the fork proximal end. Unfortunately, the threaded portions of the adjustable length rod are subject to stress concentration and cross section reduction which reduces the structural strength of the rod, and is thus a weak link prone to failure in the linkage connecting the tractor to the fork trail assembly.

In order to avoid the weaknesses in an adjustable length pull rod, a fixed length pull rod can be used. If a fixed length pull rod is used, however, in order to modify the length of the pull rod to adjust the fork slope, the pull rod must be cut to the desired length or an extension added, such as by welding. Unfortunately, modifying the length of a fixed length pull rod is labor intensive and degrades the serviceability of the truck in the field.

Both of the above solutions requires lifting the pallet truck off of the ground to gain access to the pull rod. This often requires removing the battery to reduce the weight of the truck prior to lifting. Moreover, changing the length of the pull rod only adjusts the height of the fork distal end and does not vertically move the fork proximal end. Vertically moving the fork proximal end is sometimes desirable to secure the necessary fork slope for pallet entry purposes. Therefore, a need exists for a fork assembly height adjustment mechanism which is simple, does not require modifying the length of the pull rod, and can adjust the height of the fork proximal end relative to the fork distal end.

SUMMARY OF THE INVENTION

The present invention provides a material handling vehicle including a truck body and a fork assembly adjacent the truck body. A link arm extending between the truck body and the fork assembly has a proximal end and a distal end. A first pivot pin is fixed to the body and pivotally links the proximal end of the link arm to the body. A second pivot pin is fixed to the fork assembly and pivotally links the distal end of the link arm to the fork assembly. At least one of the first and second pivot pins includes an eccentric body interposed between ends. The eccentric body defines a first axis, and the ends define a second axis, wherein the link arm pivots about the first axis and rotation of the pivot pin about the second axis moves the first axis relative to the truck body to change the position of the fork assembly relative to the truck body.

A general objective of the present invention is to provide a material handling vehicle having a fork height adjustment mechanism which does not require modifying the length of the pull rod. This objective is accomplished by providing a link arm, such as a bell crank, connecting the truck body to the pull rod, wherein the bell crank pivots about a pivot pin having an eccentric body and rotation of the pivot pin vertically and horizontally moves the bell crank pivot axis to adjust the slope of the fork assembly.

Another objective of the present invention is to provide a material handling vehicle having a fork height adjustment mechanism which vertically moves the proximal end of the fork assembly relative to the distal end of the fork assembly. This objective is accomplished by linking the vehicle body to the proximal end of the fork assembly using the pivot pin having an eccentric body which upon rotation vertically moves the proximal end of the fork assembly relative to the distal end of the fork assembly.

These and still other objectives and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

DETAILED DESCRIPTION OF PREFERRED EMBODIMENTS

Figure 1:
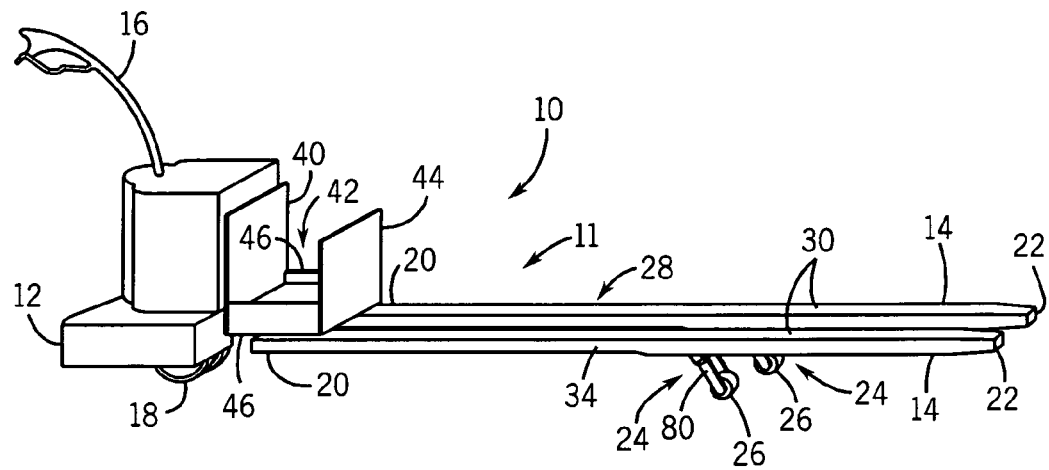
FIG. 1 is a side perspective view of a pallet truck incorporating the present invention.
Figure 2:
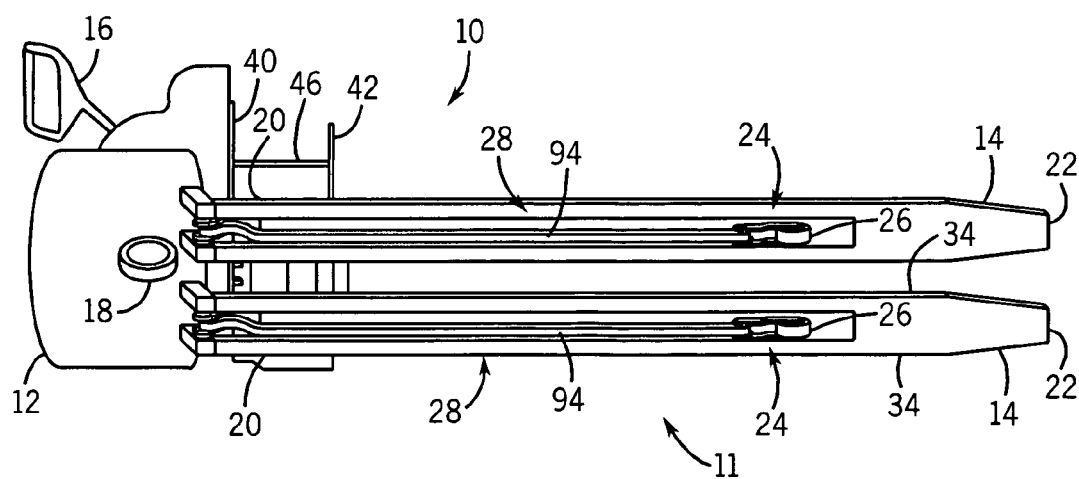
FIG. 2 is a bottom perspective view of the pallet truck of FIG. 1.
Figure 3:
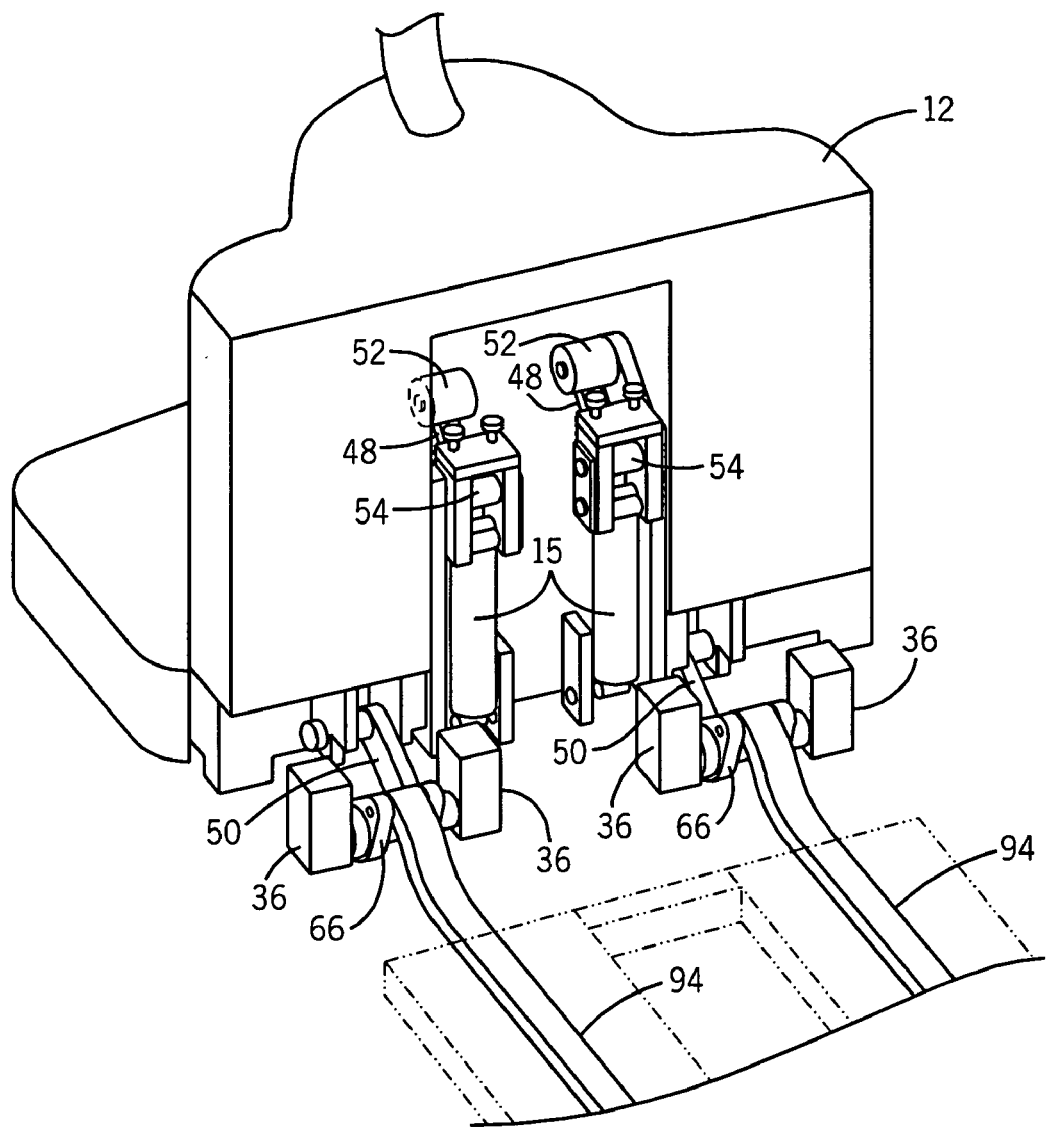
FIG. 3 is a front perspective cutaway view the pallet truck of FIG. 1.

A powered pallet truck 10 shown in FIGS. 1–3 includes a wheel mounted chassis 12, or body, upon which a fork assembly 11 is mounted for vertical movement. A control handle 16 extending from the chassis 12 controls the speed and direction of the truck 10. The fork assembly has a lower position for slipping under a load and a raised position for lifting the load.

The chassis 12 houses a power unit (not shown) and a traction motor (not shown). The power unit, such as a hydraulic power unit, powers a pair of hydraulic cylinders 15 to raise and lower the forks assembly 14. The traction motor rotatably drives a drive wheel 18 in response to inputs provided by an operator through the control handle 16. Although a powered pallet truck is disclosed, the pallet truck can be a manual truck without departing from the scope of the invention.

Figure 4:
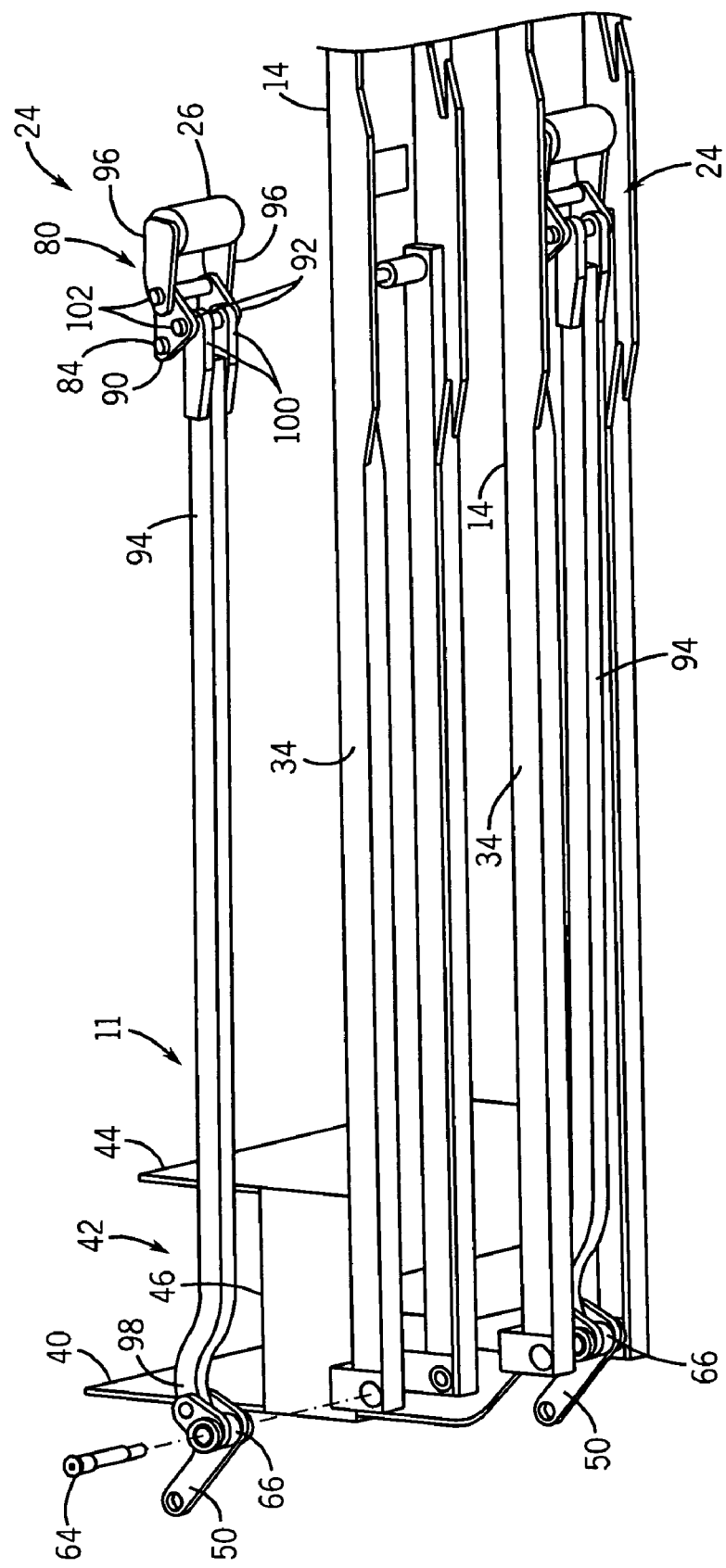
FIG. 4 is a bottom perspective partially exploded view of the fork assembly of FIG. 1.
Figure 5:
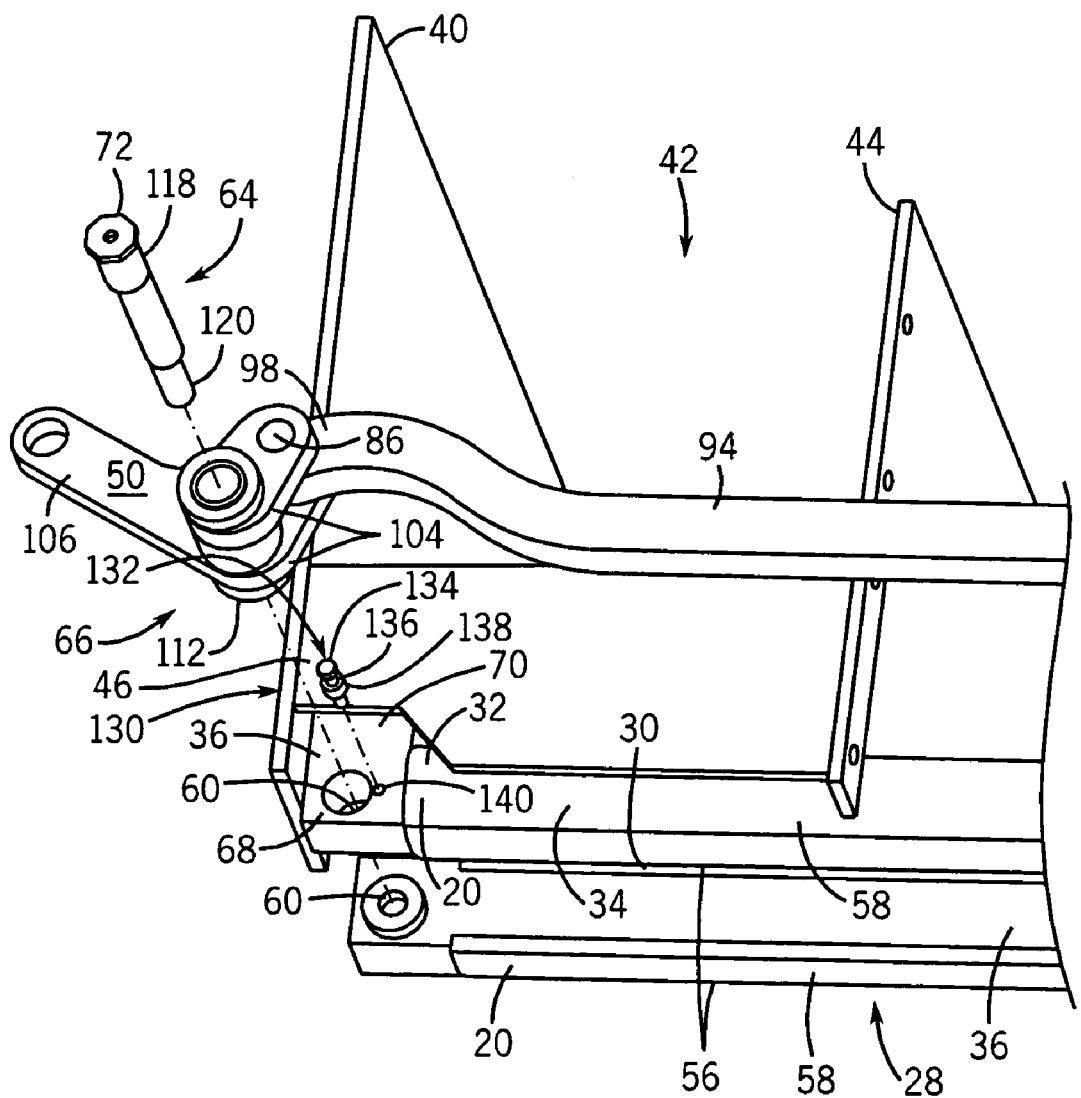
FIG. 5 is a detailed perspective partially exploded view of one of the forks of FIG. 4.

Referring to FIGS. 4 and 5, the fork assembly 11 includes a pair of elongated, spaced forks 14, each fork 14 having a proximal end 20 and a distal end 22. The forks 14 are joined at their proximal ends 20 by a back plate 40. The back plate 40 is linked to the chassis 12 to support the proximal end 20 of the forks 14, and forms part of a battery compartment 42. The distal end 22 of each fork is supported by a fork trail assembly 24 having a ground engaging wheel 26 which extends from the fork 14 as the fork 14 is raised vertically.

The battery compartment 42 includes the back plate 40 and a front plate 44 joined by opposing side plates 46. The plates 40, 44, 46 are joined using methods known in the art, such as by welding. The forks 14 define the floor of the battery compartment 42, and extend through the front plate 44 away from the back plate 40. Of course, if the pallet truck is manual, a battery compartment is not required. Moreover, the battery compartment can be housed in the chassis without departing from the scope of the invention.

The fork assembly 11 is fixed to the chassis 12 proximal the fork proximal ends 20 by a pair of upper link arms 48 and lower link arms 50, as is known in the art. The link arms 48, 50 supports the proximal end 20 of the forks 14 above the ground and allow vertical movement of the fork assembly 11 relative to the chassis 12. The lower link arms 50 form part of a bell crank 66 which pivotally link the proximal end 20 of the forks 14 to the chassis 12 and actuates the fork trail assembly 24. Preferably, the upper link arms 48 have one end 52 pivotally connected to the chassis and an opposing link end 54 pivotally connected to the back plate 40. Although upper link arms are shown, sliding members can be provided, such as known in the art, without departing from the scope of the invention.

Each fork 14 is substantially identical, thus only one fork will be described with the understanding that the description applies to the other fork. The fork 14 includes a U-shaped section 28 having a top wall 30 which engages a load supported by the fork 14. The top wall 30 includes opposing longitudinal edges 32. A downwardly depending side wall 34 joined to each top wall edge 32 in an edge to edge relation defines the U-shape. A shelf 56 extends inwardly from a lower edge 58 of each side wall 34 along a portion of the fork 14. Each shelf supports a structural member 36 which extends from the proximal end 20 of the fork 14 toward the fork trail assembly 24. The structural member 36 stiffens the fork 14, and extends a short distance from the fork proximal end 20 toward the chassis and adjacent one of the side walls 34 toward the fork trail assembly 24.

Each structural member 36 is interposed between the fork top wall 30 and the shelf 56 extending from the adjacent side wall lower edge 58. Coaxial openings 60 formed in each structural member 36 proximal the fork proximal end 20 receive a pivot pin 64 to pivotally mount a bell crank 66 which supports the fork proximal end 20 and actuates the fork trail assembly 24 upon vertical movement of the fork assembly 11. A slot 68 formed in an outwardly facing surface 70 of one of the structural members 36 and intersecting the opening 60 therethrough engages a head 72 of the pivot pin 64.

As shown in FIG. 4, the fork trail assembly 24 supports the distal end 22 of the fork 14, and includes a pivot member 80, also known as a fork trail, which pivots about a pivot shaft 84 to extend and retract the ground engaging wheel 26 between an extended position (shown in FIG. 1) and a retracted position (shown in FIG. 4). The pivot shaft 84 is fixed to the fork 14, and extends between the fork side walls 34. The wheel 26 can be any wheel used in the art, such as a bearing mounted wheel formed from steel, nylon, polyurethane, and the like. Although only one wheel is shown, the fork trail assembly can include one or more wheels without departing from the scope of the invention.

The pivot member 80 has one end pivotally fixed to the pivot shaft 84, and pivots about the shaft 84 to extend and retract the wheel 26 fixed to the pivot member opposing end. Preferably, the one end of the pivot member 80 includes a pair of arms 90 pivotally fixed to the pivot shaft 84. Each arm 90 includes a lug 92 (best shown in FIG. 4) for attaching a pull rod 94 thereto. Preferably, the opposing end of the pivot member includes a pair of legs 94 extending away from the arms 90. The pair of opposing legs 96 rotatably mount the wheel 26 therebetween. Although a pair of legs 96 is preferred, the pivot member 80 can include any structure suitable for rotatably mounting one or more wheels thereto, such as a single leg having a wheel shaft fixed thereto, and the like without departing from the scope of the invention.

The pull rod 94 links the bell crank 66 to the pivot member 80 of the fork trail assembly 24 A distal end 100 of the pull rod 94 is interposed between the pivot arm lugs 92, and a pin 102 extending between the lugs 92 and through the pull rod 94 pivotally connects the pull rod 94 to the pivot member 80. A proximal end 98 of the pull rod 94 is pivotally linked to the bell crank 66 using a pin 86. Preferably, the pull rod has a fixed length formed from a solid metal, such as steel, and the like, to provide a strong link between the bell crank and fork trail assembly. An adjustable length pull rod, however, can be provided without departing from the scope of the invention. Although a pull rod is disclosed, any link member that links the bell crank and fork trail assembly can be used, such as a push rod, a linkage comprising a plurality of linking elements, and the like, without departing from the scope of the invention.

Figure 6:
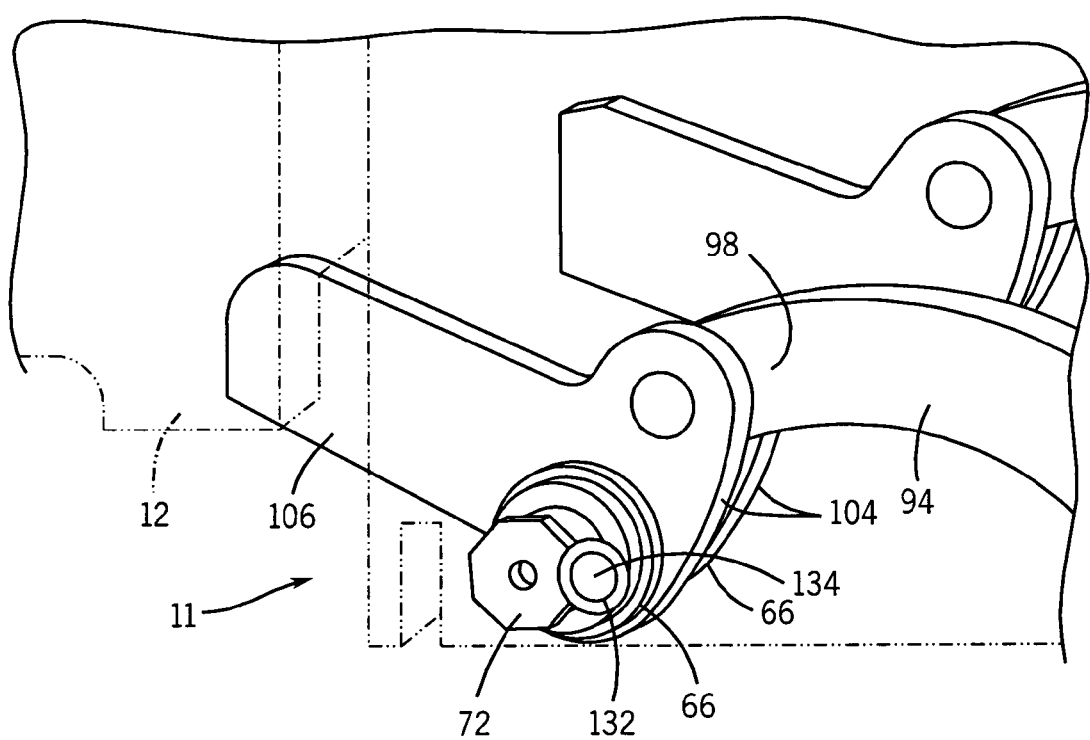
FIG. 6 is an detailed, cut-away, side perspective view of the fork assembly of FIG. 1.
Figure 7:
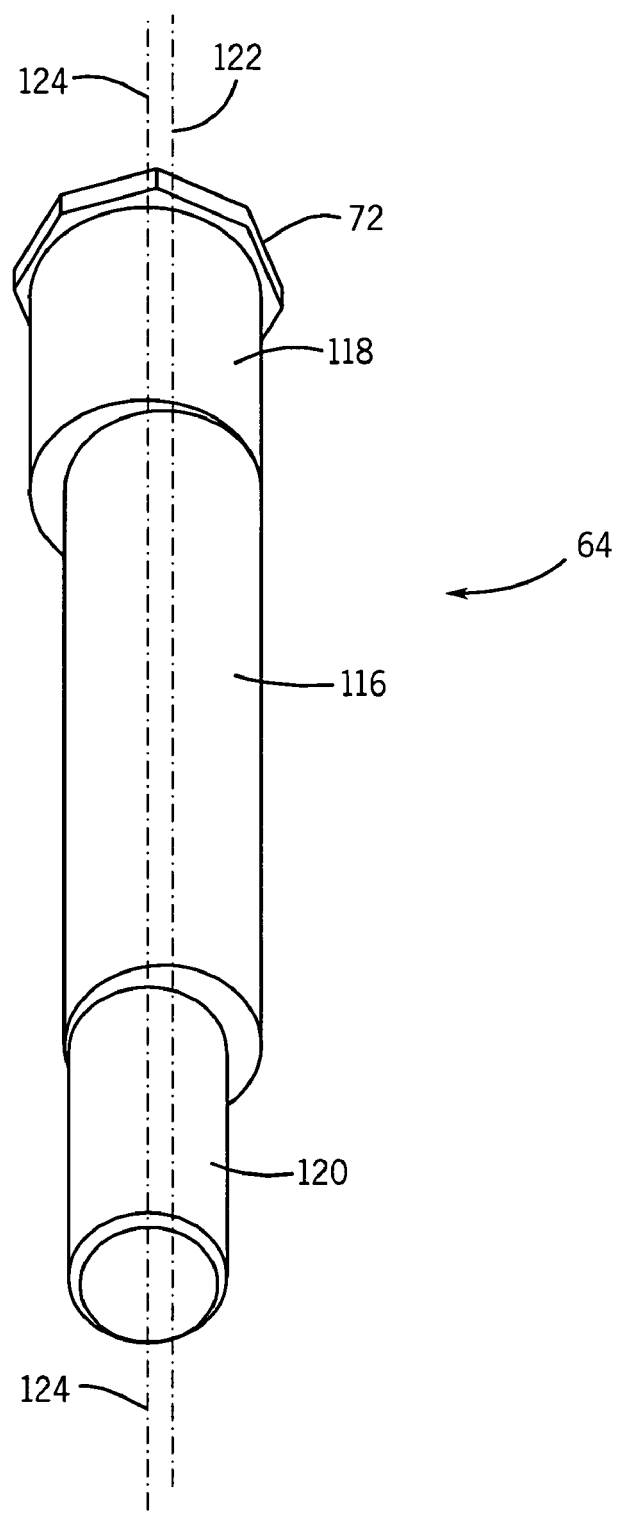
FIG. 7 is a perspective view of the pivot pin of FIG. 4.

Referring to FIGS. 5–7, the bell crank 66 is pivotally mounted to the fork assembly 11 between the fork structural members 36, and links the pull rod 94 to the chassis 12. The bell crank 66 includes a pair of first legs 104 pivotally connected to the proximal end 98 of the pull rod 94 received therebetween and a second leg 106, forming the lower link arm 50, pivotally connected to the chassis 12. The first and second legs 104, 106 are joined at their respective proximal ends 108, 110 by a tubular member 112 to define an obtuse angle between the first legs 104 and the second leg 106. The tubular member 112 receives the pivot pin 64 to pivotally mount the bell crank 66 to the fork assembly 11. Advantageously, as the fork assembly 11 moves vertically, the bell crank 66 pivots about a bell crank pivot axis to exert a force on the pull rod 94 and move the fork trail assembly wheel 26 between the extended and retracted positions.

The bell crank 66 is pivotally mounted to the fork assembly 11 between the structural members 36 by the pivot pin 64. The pivot pin 64 includes an eccentric body 116 interposed between pivot pin ends 118, 120. The bell crank 66 pivots about the bell crank pivot axis which is coaxial with a longitudinal axis 122 defined by the eccentric body 116. Advantageously, the eccentric body 116 defines a bell crank pivot axis that can be moved vertically relative to the chassis 12 and horizontally relative to the fork trail assembly 24 by rotation of the pivot pin 64. The pivot pin body 116 is supported by the pivot pin ends 118, 120 which are received in the openings 60 formed through the structural members 36 on opposite side of the bell crank 66. Preferably, the pivot pin ends 118, 120 define an axis 124 which is parallel to and offset from the eccentric body axis 122.

The pivot pin head 72 is coaxial with the pivot pin ends axis 124, and is fixed to one end 118 of the pivot pin 74. The head 72 is polygonal, and engages the slot 68 formed in one of the structural members 36 to prevent rotation of the pivot pin 74. An octagonal pivot pin head is preferred to provide four rotational positions of the pin, and thus four different positions of the bell crank pivot axis. The head, however, can have any shape, as long a means is provided to prevent undesired rotation of the pin, without departing from the scope of the invention.

The pivot pin head 72 is held in the slot 68 by a locking member 130 which prevents axial movement of the pivot pin 64. Preferably, as shown in FIGS. 5 and 6, the locking member 130 includes a bolt 132 having a bolt head 134 fixed to one end of a threaded bolt body 136. The bolt body 136 extends through a washer 138, and threadably engages a threaded hole 140 formed in the structural member 36 adjacent the opening 60 receiving the pivot pin end 118. The washer 138 is sandwiched between the bolt head 134 and the pivot pin head 72 to prevent undesired axial movement of the pivot pin 64. Of course, a bolt having a head sufficiently large to overlap the pivot pin head can be provided, and the washer can be eliminated, without departing from the scope of the invention. Although a locking member including a bolt is preferred, other structure can be used to prevent axial movement of the pivot pin, such as a cotter pin extending through a radial hole formed through the pin adjacent an inner surface of the structural, without departing from the scope of the invention.

In use, the slope of the fork is adjusted by disengaging the locking member 130 from the pivot pin head 72 and axially moving the pivot pin head 72 clear of the slot 68. The pivot pin 64 is then rotated about the pivot pin ends axis 124 to move the eccentric pin body 116 vertically and horizontally relative to the fork trail assembly 124 and chassis 12. Horizontal movement of the eccentric pin body 116 exerts a force on the pull rod 94 which pivots the fork trail assembly pivot member 80 to move the ground engaging wheel 26 toward the extended or retracted position and change the height of the fork distal end 22 relative to the ground and the fork proximal end. 20 The vertical movement of the eccentric pin body 116 moves the fork proximal end 20 vertically relative to the ground and the fork distal end 22 to further adjust the fork slope.

Once the desired fork slope is reached, the pivot pin head 72 is axially slipped into engagement with the slot 68 to prevent further rotation of the pivot pin 64. The locking member 130 is then engaged to axially lock the pivot pin 64 in place, and prevent undesired rotation of the pivot pin 64.

Advantageously, the present invention provides a method an apparatus for adjusting the slope of the forks independent of each other without lifting the pallet truck or cutting or welding on the pull rod. Moreover, although a pivot pin connecting each bell crank is disclosed, a single pivot pin extending through both bell cranks can be used without departing from the scope of the invention.

In an alternative embodiment, the pivot pin having the eccentric body is fixed to the chassis and pivotally links the upper and/or lower link arms to the chassis. As described above, rotation of the link arm moves the axis of the eccentric body to move the fork assembly relative to the chassis.

While there has been shown and described what are at present considered the preferred embodiments of the invention, it will be obvious to those skilled in the art that various changes and modifications can be made therein without departing from the scope of the invention defined by the appended claims.

We claim:

1. A material handling vehicle comprising:
   a truck body;
   a fork assembly fixed to said truck body, and movable vertically relative to said truck body, said fork assembly having a proximal end and a distal end, said proximal end being proximal said truck body;
   a fork trail assembly mounted to said fork assembly proximal said fork assembly distal end, and having an extended position and a retracted position to support said distal end as said fork assembly moves vertically relative to said truck body;
   a link member having one end pivotally connected to said fork trail assembly and an opposing end extending toward said proximal end of said fork assembly, wherein said link member exerts a force on said fork trail assembly to move said fork trail assembly between said extended position and said retracted position;
   a bell crank having a first leg and a second leg, said first leg being pivotally connected to said link member opposing end, and said second leg being pivotally connected to said truck body; and
   a pin having an eccentric body pivotally connecting said bell crank to said fork assembly, and defining a bell crank pivot axis at the junction of said bell crank first and second legs, wherein rotation of said pin moves said bell crank pivot axis horizontally relative to said fork trail assembly and vertically relative to said truck body, and horizontal movement of said pivot axis relative to said fork trail assembly exerts a force on said link member that is transmitted by said link member to said fork trail assembly to move said fork trail assembly toward one of said extended position and said retracted position to change the height of said fork assembly distal end relative to said fork assembly proximal end, and vertical movement of said pivot axis relative to said body changes the height of said fork assembly proximal end relative to said fork assembly distal end.

2. The material handling vehicle as in claim 1, in which said fork assembly includes at least one fork defining said fork assembly distal end, and said fork trail assembly is mounted to said fork.

3. The material handling vehicle as in claim 1, in which said link member has a fixed length.

4. The material handling vehicle truck as in claim 1, in which said pin is fixed to selectively prevent rotation of said pin.

5. The material handling vehicle as in claim 1, in which said pin is supported on opposing sides of said bell crank orthogonal to said pivot axis by a pair of structural members fixed to said fork assembly.

6. The material handling vehicle as in claim 5, in which at least one of said structural members includes a slot intersecting a through hole formed through said one of said structural members, wherein one end of said pin is received in said through hole, and said pin includes a head received in said slot.

7. The material handling vehicle as in claim 6, in which said pin head is polygonal, and at least one surface of said polygonal head engages said slot to prevent rotation of said pin.

8. The material handling vehicle as in claim 6, including a locking member axially locking said pin in said through hole.

9. The material handling vehicle as in claim 8, in which said locking member is a bolt axially restraining said pivot pin.

10. A material handling vehicle comprising:
a truck body;
a fork assembly adjacent said truck body;
a link arm extending between said truck body and said fork assembly, and having a proximal end and a distal end;
a first pivot pin fixed to said body and pivotally linking said proximal end to said body;
a second pivot pin fixed to said fork assembly and pivotally linking said distal end to said fork assembly;
wherein, said first pivot pin includes an eccentric body interposed between ends, said eccentric body defining a first axis, and said ends of said first pivot pin defining a second axis, wherein said link arm pivots about said first axis and rotation of said first pivot pin about said second axis moves said first axis relative to said truck body to change the position of said fork assembly relative to said truck body.

11. The material handling vehicle as in claim 10, in which said link arm forms part of a bell crank forming part of a linkage linking a fork trail assembly to said truck body.

12. The material handling vehicle as in claim 10, in which said first pivot pin is fixed to selectively prevent rotation of said pin.

13. The material handling vehicle as in claim 10, in which said first pivot pin is supported on opposing sides of said link arm orthogonal to said second axis by a pair of structural members fixed to said fork assembly.

14. The material handling vehicle as in claim 13, in which at least one of said structural members includes a slot intersecting a through hole formed through said one of said structural members, wherein one end of said first pivot pin is received in said through hole, and said one end includes a head received in said slot.

15. The material handling vehicle as in claim 14, in which said pin head is polygonal, and at least one surface of said polygonal head engages said slot to prevent rotation of said first pivot pin.

16. The material handling vehicle as in claim 14, including a locking member axially locking said first pivot pin in said through hole.

17. The material handling vehicle as in claim 16, in which said locking member is a bolt axially restraining said first pivot pin.

18. A material handling vehicle comprising:
a truck body;
a fork assembly adjacent said truck body;
a link arm extending between said truck body and said fork assembly, and having a proximal end and a distal end;
a first pivot pin fixed to said body and pivotally linking said proximal end to said body;
a second pivot pin fixed to said fork assembly and pivotally linking said distal end to said fork assembly;
wherein, at least one of said first and second pivot pins includes an eccentric body interposed between ends, said eccentric body defining a first axis, and said ends of said at least one of said first and second pivot pins defining a second axis, wherein said link arm pivots about said first axis and rotation of said pivot pin about said second axis moves said first axis relative to said truck body to change the position of said fork assembly relative to said truck body; and
a polygonal pin head joined to one of said ends of said at least one of said first and second pivot pins engaging a locking member which selectively prevents rotation of said eccentric body.

* * * * *